(12) United States Patent
Ishii

(10) Patent No.: US 6,449,094 B1
(45) Date of Patent: Sep. 10, 2002

(54) OPTICAL SYSTEM INCLUDING DIFFRACTION OPTICAL ELEMENT

(75) Inventor: Tetsuya Ishii, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 1037 days.

(21) Appl. No.: 08/638,759

(22) Filed: Apr. 29, 1996

(30) Foreign Application Priority Data

May 9, 1995 (JP) .............................. 7-110608

(51) Int. Cl.⁷ .............................. G02B 27/44; G02B 9/08
(52) U.S. Cl. ...................... 359/565; 359/571; 359/613; 359/738
(58) Field of Search .................. 359/565, 613, 359/559, 562, 563, 569, 738, 739, 740, 558, 571; 349/66

(56) References Cited

U.S. PATENT DOCUMENTS

| 4,082,433 A | * | 4/1978 | Appeldorn et al. | 359/742 |
| 4,539,482 A | * | 9/1985 | Nose | 359/565 |
| 4,904,049 A | * | 2/1990 | Hegg | 385/16 |
| 4,960,314 A | * | 10/1990 | Smith et al. | 359/15 |
| 5,016,950 A | * | 5/1991 | Smith | 359/19 |
| 5,517,279 A | * | 5/1996 | Hugle et al. | 355/46 |

FOREIGN PATENT DOCUMENTS

| JP | A-63-142318 | * | 6/1988 | 359/742 |
| JP | A-05-323122 | * | 12/1993 | G02B/5/32 |
| JP | A-06-148407 | * | 5/1994 | G02B/3/08 |
| JP | 7-9488 B2 | | 2/1995 | G02B/6/04 |

OTHER PUBLICATIONS

G.J. Swanson, "Binary Optics Technology: The Theory and Design of Muti-level Diffractive Optical Elements", Technical Report 854, MIT Lincoln Laboratory, Aug. 14, 1989, pp. 1–49.

* cited by examiner

Primary Examiner—Cassandra Spyrou
Assistant Examiner—John Juba, Jr.
(74) Attorney, Agent, or Firm—Stevens, Davis, Miller & Mosher, LLP

(57) ABSTRACT

An optical system including a diffraction optical element and for forming an image of an object by light having a given wavelength width includes at least one diffraction optical element and a diffraction light selection element for transmitting a diffraction light of given order to an output side of the diffraction optical element and for attenuating the diffraction light of orders other than the given order.

9 Claims, 6 Drawing Sheets

FIG_1
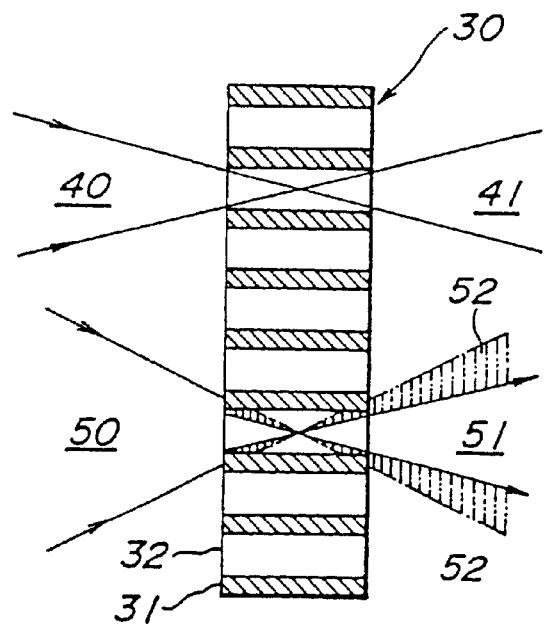
FIG_2
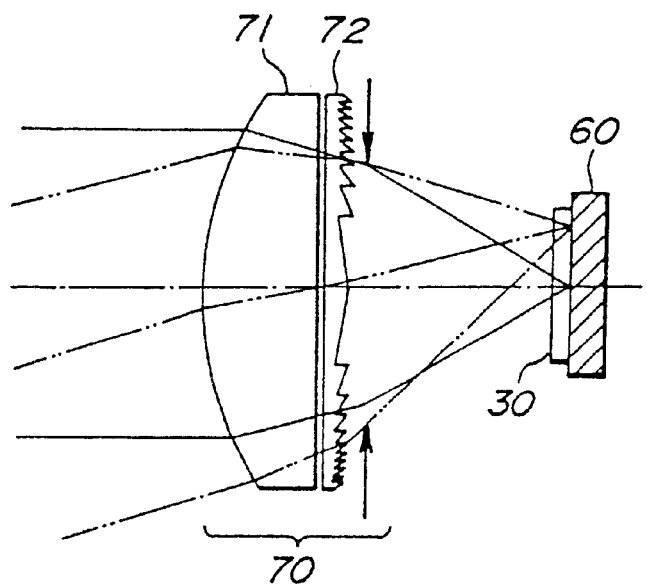

FIG._3
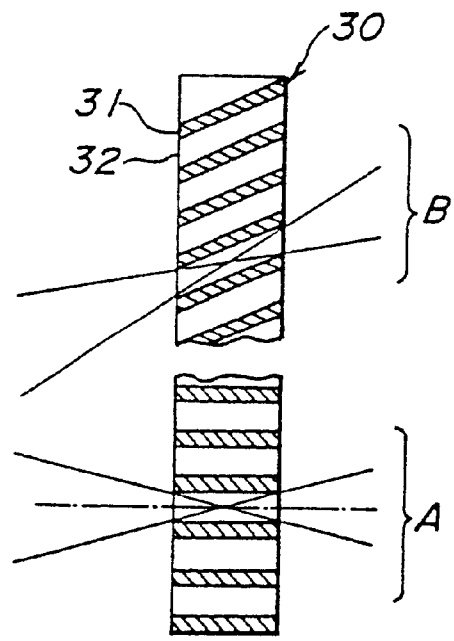
FIG._4
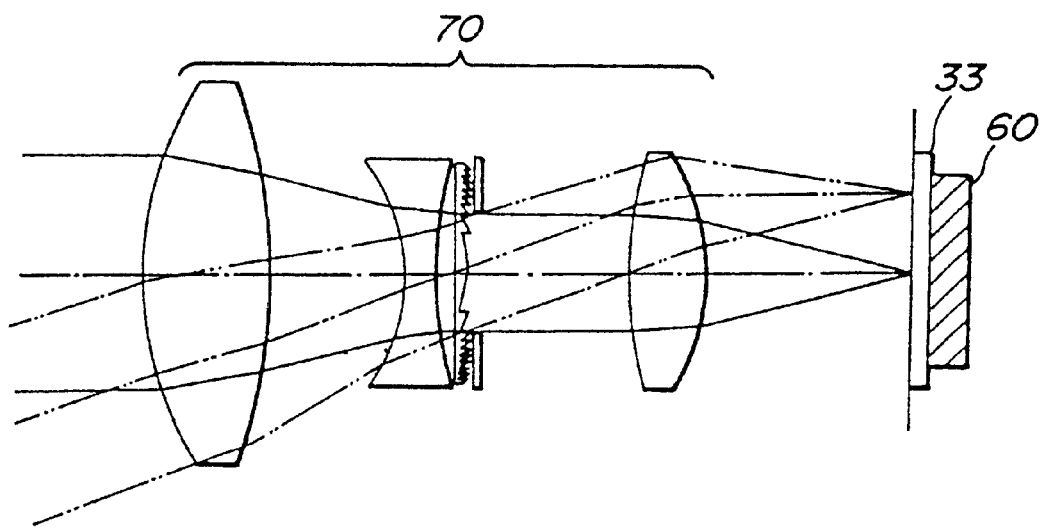

FIG_9
PRIOR ART
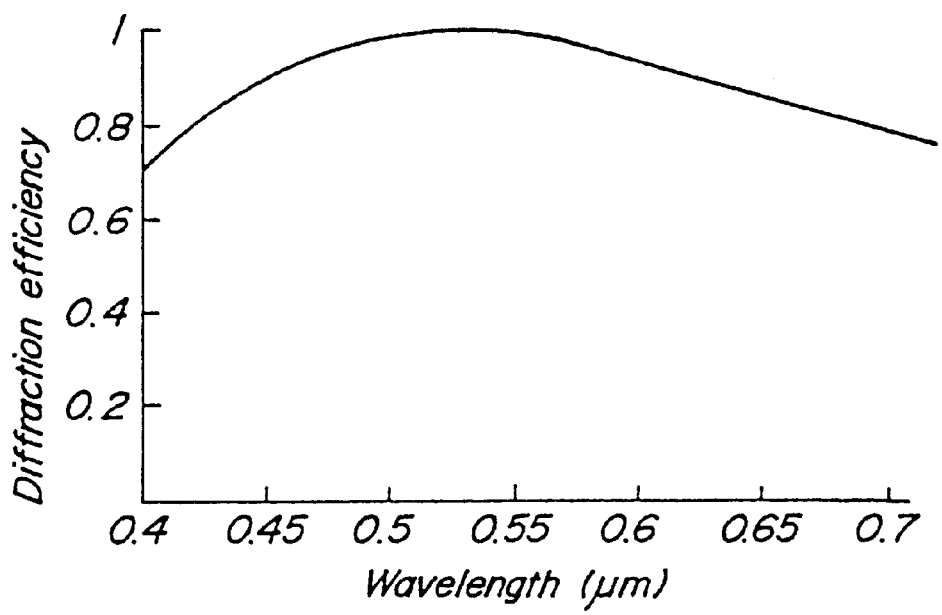
FIG_10
PRIOR ART
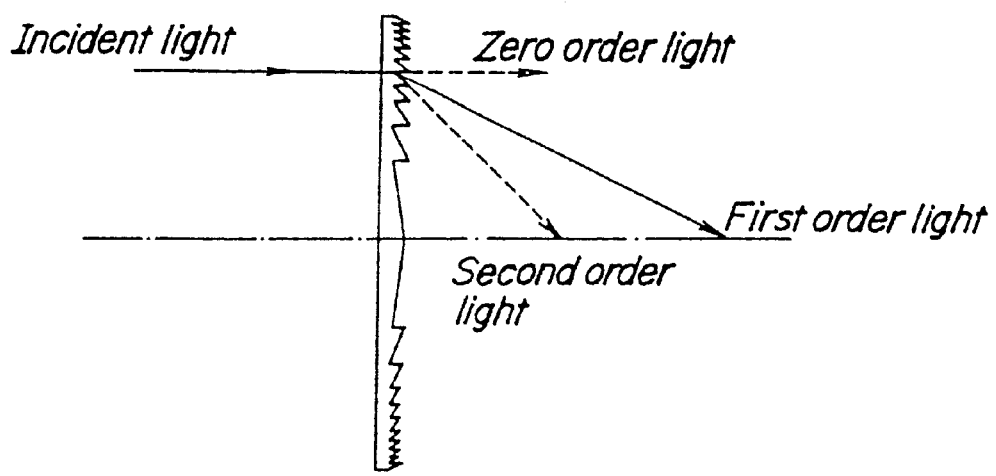

OPTICAL SYSTEM INCLUDING DIFFRACTION OPTICAL ELEMENT

BACKGROUND OF THE INVENTION

1. Field of the Invention

The present invention relates to an optical system including a diffraction optical element which is used at a plurality of wavelengths.

2. Related Art Statement

The diffraction grating (diffraction lens) with condensing function is well known to have a property which is not present in a conventional refraction lens, as shown hereinafter.

(1) A spherical waves can easily be generated, so that an aberration can effectively be compensated.
(2) The diffraction optical element can have no substantial thickness, so that it has a high freedom of design, and thus a compact optical system can be realized.
(3) Since the amount corresponding to Abbe's number in refraction lens a becomes negative amount in the diffraction lens, chromatic aberration can be corrected effectively, by combining the diffraction lens with the refraction lens.

When the characteristic of such a diffraction lens is utilized, the property of the optical system can be improved. This is described in, for example, Binary Optical Technology; The Theory and Design of Multilevel Diffractive Optical Element, Gray J. Swanson, Technical Report 854, MIT Lincoln Laboratory, August 1989.

As described above, on the one hand, the diffraction optical element has a number of useful characteristics which are not present in the conventional refraction element, but on the other hand the refraction efficiency thereof is dependent on the wavelength, so that if the diffraction optical element is used as a lens element, a plurality of diffraction lights (plural focuses) are present, which is unfavorable. Then, in the diffraction lens, generally as shown in FIG. 8, a base material member 10 being transparent to the utilized wavelength, is provided with a blazed relief pattern 20 having a cross-sectional form of a saw tooth shape, thereby concentrating energy to the diffraction light of a particular order.

However, as shown in FIG. 8, when the cross-sectional form is made to have a saw-tooth shape, the wavelength for maximum energy concentration is different according to its groove depth, so that it can not be rendered to concentrate the energy of wave-band light having a certain wavelength width to the diffraction light of a special order. Such a phenomenon does not cause any problem, for example, in case of using a mono-chromatic light source, such as a laser, but in the optical system utilizing white light, such as a camera, if the diffraction efficiency is made optimized with the light of special wavelength, a problem that the diffraction efficiency with the other wavelengths becomes decreased is caused.

FIG. 9 shows a wavelength dependency of a diffraction efficiency of first order diffraction light, in which in the diffraction optical element has a cross-sectional form shown in FIG. 8, BK7 is used as a base material member 10, and a relief pattern 20 is formed with a groove depth in such a manner that the diffraction efficiency of the first order diffraction light becomes 100% with wavelength $\lambda=510$ nm. It is found from FIG. 9 that in a range of $\lambda=400$ nm to $\lambda=700$ nm which is generally considered to be a visible wavelength range, the diffraction efficiency is decreased according as it is away from the optimized wavelength $\lambda=510$ nm, and the decrease of the diffraction efficiency, particularly, becomes remarkable in a shorter wavelength region.

Such a problem, moreover, is not confined to a problem in which only the spectral transmittance becomes decreased. That is, in the wavelengths in which the groove is not optimized, the diffraction efficiency of required order light does not reach 100%, but diffraction light of an unrequired order is generated.

FIG. 10 shows unrequired order light of zero order light and second order light displaced in front of or behind the first order light, as produced by the blazed diffraction optical element having the wavelength depending property of the diffraction efficiency of first order diffraction light shown in FIG. 9, and FIG. 11 shows the wavelength depending property of diffraction efficiency of unrequired order light. As is found from FIG. 11, when the diffraction efficiency of first order diffraction light becomes decreased, the diffraction efficiency of second order diffraction light becomes increased at the shorter wavelength side rather than the optimized wavelength side, and the diffraction efficiency of zero order diffraction light becomes increased at the longer wavelength side rather than the optimized wavelength side. Particularly, the increase of second diffraction light becomes remarkable at the shorter wavelength range.

In this way, if unrequired order light is generated, in the optical system using light of a certain wavelength width, for example, in an imaging optical system using white light, a flare or a ghost is caused, thereby decreasing the property of optical system.

SUMMARY OF THE INVENTION

It is an object of the present invention to eliminate the above described disadvantages of the conventional optical system including a diffraction optical element.

It is another object of the present invention to provide an optical system including a diffraction optical element, in which in case of using a plurality of wavelengths or light of some wave-band, the decreasing of the property of the optical system accompanying a wavelength dependency of diffraction efficiency may be prevented and the generation of a flare or a ghost due to light of an unrequired order can be prevented effectively.

According to the present invention, there is provided an optical system for forming an image of an object by light having a given wavelength width, comprising at least one diffraction optical element and a diffraction light selection element for transmitting a diffraction light of a given order to an output side of the diffraction optical element and for attenuating the diffraction light of orders other than the given order.

In an embodiment of the image display system according to the present invention, the diffraction light selection element is constructed by a numerical aperture limiting member for limiting light flux and having a larger numerical aperture than the numerical aperture of a given magnitude. In this way, it is preferable to screen the light incident from outside a given solid angle, thereby decreasing the unrequired order light, selectively.

In a preferable embodiment of the optical system according to the present invention, it further comprises a refraction optical element, and the diffraction optical element is constructed by a blazed diffraction lens, and the diffraction optical element and the refraction optical element have the refraction power of the same sign. In this way, the diffraction light of the second order can be screened effectively.

As seen from FIG. 10, the problem due to an unrequired order of light is caused by a difference of diffraction angle between the required diffraction light and the unrequired order light. Specifically speaking, if a plurality of diffraction lights are generated in the diffraction lens included in the imaging optical system, generally, a plurality of images corresponding to respective diffraction lights are generated, thereby causing a problem of generating a spot flare or a ghost. In order to resolve such a problem, therefore, it is advantageous to shield the unrequired order light efficiently, by paying attention to the difference of diffraction angle between the required diffraction light and the unrequired order light.

By taking the above points into consideration, in the present invention, a diffraction light selection element for transmitting a diffraction light of given order and for attenuating the diffraction light of orders other than the given order, for example, a numerical aperture limiting member for limiting light flux having a larger numerical aperture than the numerical aperture of a given magnitude, is provided on the emanating side of the diffraction optical element.

BRIEF DESCRIPTION OF THE DRAWINGS

FIG. 1 is an explanatory view showing a principle of the optical system according to the present invention;

FIG. 2 is a plan view showing a first embodiment of the optical system according to the present invention;

FIG. 3 an explanatory view showing details of the louver shown in FIG. 2;

FIG. 4 is a plan view showing a second embodiment of the optical system according to the present invention;

FIG. 9 an explanatory view showing a property depending wavelength of light of first order in the diffraction optical element;

FIG. 10 is an explanatory view showing the state of generating light of an unrequired order from the diffraction optical element.

DETAILED EXPLANATION OF THE PREFERRED EMBODIMENT

Figure 5:
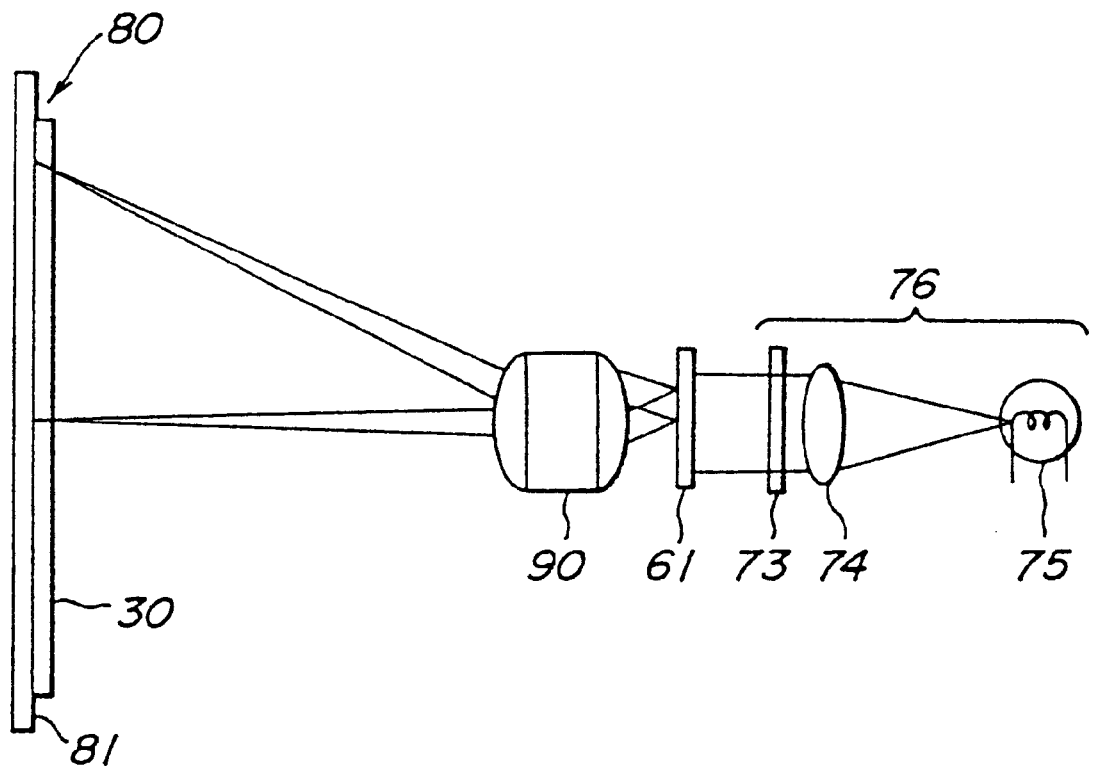
FIG. 5 is a plan view showing a third embodiment of the optical system according to the present invention.

Now to the drawings, there are shown various embodiments of an optical system according to the present invention. Like parts are shown by corresponding reference characters throughout several views of the drawings.

FIG. 1 shows an explanatory view showing a principle of the optical system according to the present invention, particularly, a function of a numerical aperture limiting member 30. This numerical aperture limiting member 30 (hereinafter, referred to as NA limiting member) comprises a light shielding or screening layer 31 for absorbing rays outside a range of special incident angles, and a light transmitting layer 32 for selectively transmitting rays within a range of special incident angles. These layers are laminated alternatively, thereby transmitting required diffraction light flux 40, selectively, and converging it on an image plane, resulting in a formation of an aimed object image. In this case, an incident NA of the NA limiting member 30 is made substantially equal to an emanating NA of the required diffraction light flux 40. In this way, the required diffraction light flux 40 incident on the NA limiting member 30 is transmitted through the light transmitting layer 32 substantially fully and is emanated therefrom as a light flux 41, so that the aimed object image can be formed on the image plane by the light flux 41.

On the contrary, the diffraction light flux of an unrequired order has a different NA and a different incident angle from those of the generally required diffraction light flux, so that the diffraction light flux of the unrequited order incident on the NA limiting member 30 is absorbed substantially by the light shielding layer 31, so that only a part of the diffraction light flux of the unrequired order can be passed through the light shielding layer 31. For example, in FIG. 1, the diffraction light flux 50 of the unrequired order having larger NA than that at emanating side of the required diffraction light flux 40 is subjected to an eclipse effect at its peripheral portion 52 by the light shielding layer 31 of the NA limiting member 30, so that the diffraction light flux 50 of the unrequired order passed through the NA limiting member 30 becomes a part of light flux 51.

In this way, in the present invention, the NA limiting member 30 shields the light incident from the outer side of the special solid angle and thus decreases the light of unrequited order selectively, so that the generation of spot flares and ghosts can be prevented effectively. The optical element having a construction such as the NA limiting member 30 shown in FIG. 1 is usually called a louver (hereinafter, referred to as a louver), but in addition thereto, a fiber plate and a field selecting glass or the like are well known as NA limiting members.

While, an optimized wavelength (wavelength having maximum diffraction efficiency) is set near the center of the wavelength band of the required order to be used, the light of the unrequired order appears on both sides of the light of the required order. For example, as shown in FIG. 11, in the case of a diffraction lens (blazed diffraction lens) having a groove construction in such a manner that the center wavelength is 510 nm and the diffraction efficiency of the first order light is 100%, zero order diffraction light or second order diffraction light in the peripheral wavelength region is increased as an unrequired order light.

Figure 11:
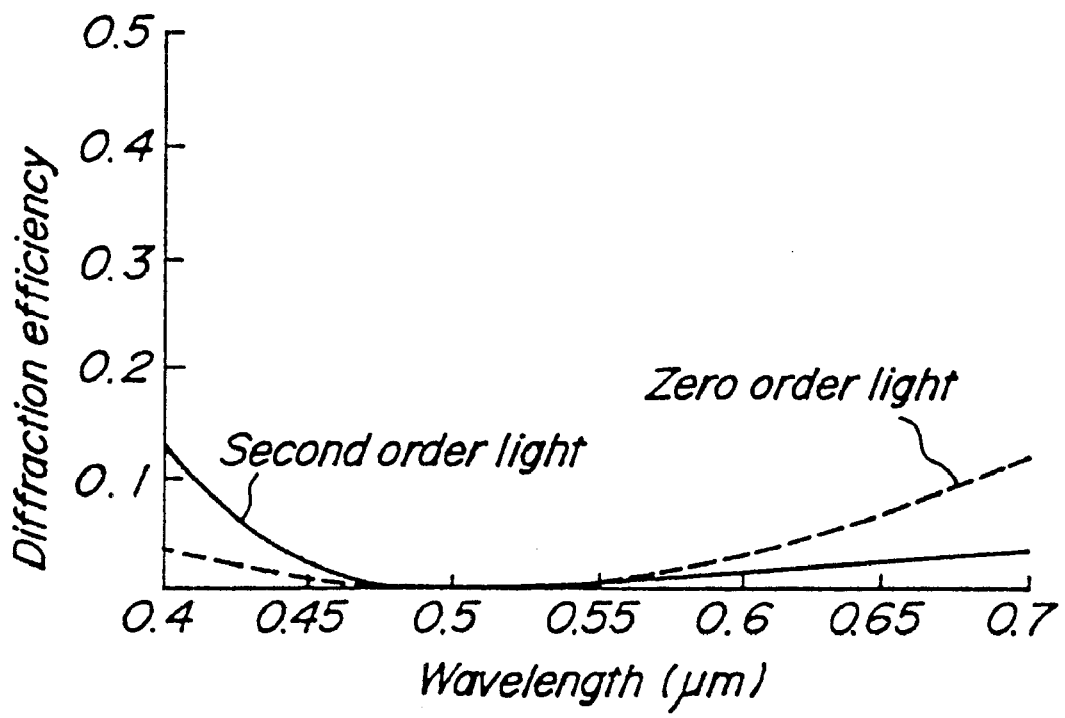
FIG. 11 an explanatory view showing a property depending wavelength of zero order diffraction efficiency and second order diffraction efficiency of light in the diffraction optical element shown in FIG. 9.

In such a way, the diffraction lights (unrequited order light) appearing on both sides of the required order diffraction light are not equal in the relation between the diffraction efficiency and the wavelength, so that as shown in FIG. 11, for example, when the required order is a first order, there is a property that the second order light is increased at the short wavelength side. Such a property means that particularly, the unrequired order light is rapidly increased at the short wavelength region, by a delicate deviation or the like of the optimized wavelength of the manufactured diffraction lens. That is, when either the zero order light or the second order light is decreased more efficiently, it is desired that the second order light having a large intensity at the short wavelength side be decreased, in order to prevent a property decrease of the optical system.

In the present invention, for example, as described above, the light incident from the outside of the special solid angle is shielded by the position of the NA limiting member 30, so that in order to shield the second diffraction light effectively, the whole optical system may be constructed in such a manner that the second order light is bent larger than the first order light.

Herein, when the function of the diffraction lens alone is noted, the second order light has a power two times that of the first order light, so that the above requirement is always satisfied. On the contrary, when the diffraction lens is used by combining it with a refraction system, it is necessary to consider a sum of the powers of the diffraction lens and the refraction lens. In order to satisfy the above requirement by making the power of the second diffraction light larger than that of the first diffraction light, the power of the diffraction lens and the power of the refraction system may not cancel with each other. That is, the power (refraction power) of the refraction system and the power (refraction power) of the diffraction lens have the same sign, and the second order light is shielded effectively, so that it is preferable to make the property of the optical system stable.

[Embodiment]

FIG. 2 shows a first embodiment of the present invention. This embodiment shows a construction of the essential portion of an imaging apparatus. In this embodiment, an imaging element 60 is disposed at the imaging position of an imaging optical system 70 including a diffraction lens, and a louver 30 acting as a diffraction light selecting element is disposed by substantially contacting it to the imaging element 60. The imaging optical system 70 comprises a refraction lens 71 having a positive refraction power and a diffraction lens 72 having a positive refraction power. The diffraction lens 72 is blazed in such a manner that the diffraction efficiency of the first diffraction light becomes maximum at the wavelength near the center of the waveband region utilized. As described above, such a combination of the refraction lens 71 and the diffraction lens 72 is effective to correct a chromatic aberration, since as described above, the quantity corresponding to Abbe's number in the refraction lens 71 becomes a negative value in the diffraction lens 72.

FIG. 3 shows a construction of a louver 30 shown in FIG. 2. This louver 30 comprises a plurality of light shielding layers 31 and a plurality of light transmitting layers 32 and respective layers 31 and 32 are alternately arranged with each other in such a manner that respective periodical constructions of these layers 31 and 32 are made different in accordance with the distance from the optical axis, i.,e. an angle between the light shielding layer 31 and the optical axis is coincident substantially with an angle between the principal ray transmitting through that region and the optical axis. That is, the louver has a construction inclined to the optical axis in such a manner that the louver has, in the region A near the optical axis, a construction in which the light shielding layer 31 is substantially parallel to the optical axis, and has, in the region B apart from the optical axis, a construction in which the light shielding layer 31 is substantially parallel to the principal ray passing through that region.

In this embodiment, the louver 30 is disposed behind the diffraction lens 72, so that the unrequired order light generated by the diffraction lens 72 can be decreased by the louver 30, and thus the generation of spot flares and ghosts can be prevented effectively. In the imaging optical system 70, also, both the refraction lens 71 and the diffraction lens 72 have a positive refraction power, so that a short wavelength component of the unrequited order light can be decreased effectively. Therefore, even if the groove depth of the diffraction lens 72 is changed by the manufacturing error, its effect can be suppressed to a relatively small extent, so that stable image can be obtained.

The louver 30 is disposed near the imaging plane in contact materially to the imaging element 60 in such a manner that the direction of the light shielding layer 31 is coincident substantially with the direction of a principal ray transmitting through its region, so that even if the range of an angle between the ray and the optical axis is changed by the image height, the light flux can be separated for every image height (respective image points) and thus an optimized filter effect can be obtained for every light flux. Therefore, the light flux of the unrequited order can be decreased effectively, while transmitting the light flux of required order with good efficiency.

FIG. 4 shows a major portion of the imaging apparatus in a second embodiment of the optical system according to the present invention. In this embodiment, an imaging optical system 70 including the diffraction lens is constructed in a telecentric form at the image side in which the principal rays at the image side are fully parallel to each other, so as to correct chromatic aberration or the like well by the function of the diffraction lens. A fiber plate 33 having a construction of a bundle of optical fibers is disposed at the image side of the imaging optical system 70 in such a manner that the end face of its incident side is coincident with the image plane of the imaging optical system 70, and the imaging element 60 is disposed in contact with the end face of the emanating side of the fiber plate 33.

In this embodiment, the imaging optical system 70 is formed in the telecentric form at the image side, so that the range of angles between the diffraction light of required order and the optical axis is substantially not dependent on the image height. Therefore, the NA at the incident side of the diffraction light selecting element becomes well and is uniform over the whole surface, so that commercially obtainable fiber plate is preferably used as the fiber plate 33, thereby decreasing the unrequired order light effectively.

As in this embodiment, if the imaging optical system 70 is formed in the telecentric form at the image side, the range of angles between the diffraction light of required order and the optical axis becomes substantially constant in the optional position between the final plane of the optical system and the image plane, so that the unrequired order light can also be decreased by arranging the diffraction light selecting element within this angular range. However, when the diffraction light selecting element is disposed at a position other than that near the image plane, the wavefront reserving element such as the louver must be utilized.

As shown in FIG. 4, also, if the fiber plate 33 is disposed so as to coincide with the end face of its incident side to the image plane of the imaging optical system 70, the end face of the emanating side of the fiber plate 33 acts materially as a focal-plane plate, so that if the imaging element 60 is removed and an ocular is disposed behind the fiber plate 33, the present optical system may be utilized as a real image finder optical system.

FIG. 5 shows a third embodiment of the optical system according to the present invention. This embodiment shows a liquid crystal projector. In this embodiment, a projection optical system 90 including the diffraction lens is constructed in such a manner that the image displayed on a liquid crystal display 61 is projected on a screen 80, and so as to correct chromatic aberration or the like well by the function of the diffraction lens. The liquid crystal display 61 is illuminated by an illumination system 76 having a light source 75, a condenser lens 74 and an attenuation filter 73. The attenuation filter 73 is so constructed that it has a relatively high transmittance in the short wavelength region. The screen 80 is constructed by a light diffusion means 81 and the louver 30 materially contacted to its plane at the side of the projection optical system 90. The diffraction lens (not shown) included in the projection optical system 90 has a positive refraction power and is optimized in such a manner that the diffraction efficiency becomes maximum at the long wavelength side from the center of the wavelength band used (visual wavelength band).

According to this embodiment, the louver 30 is disposed behind the projection optical system 90 including the diffraction lens, so that the unrequired order light generated by the diffraction lens can be decreased effectively, and thus the generation of the spot flare and the ghost can be prevented effectively. Moreover, the light diffusing means 81 is disposed behind the louver 30, so that sufficient field angle can be secured at the observing side at which the NA is limited (at the opposite side of the projection optical system 90).

The diffraction lens 72 has positive refraction power and also has it even in a whole projection optical system, so that the short wavelength components of the unrequited order light can be decreased effectively, and thus for example, even when the groove depth of the diffraction lens is changed by the manufacturing error, its effect can be suppressed to a comparatively small extent, so that stable image can be obtained.

Moreover, since the optimized wavelength by which the diffraction efficiency is made maximum is shifted at the short wavelength side, the unrequired order light at the long wavelength side can be suppressed basically, and thus the unrequired order light at the short wavelength side can be decreased effectively by the louver 30, so that the unrequired order light can be further decreased as a whole. Moreover, the optimized wavelength is shifted to the long wavelength side, so that the decrease of light quantity at the short wavelength side can be compensated by the attenuation filter 73 having a relatively high transmittance at the short wavelength side, and thus the color balance can be held well as a whole.

Moreover, in this embodiment, the diffraction lens included in the projection optical system 90 has a positive refraction power, but this diffraction lens may have a negative refraction power. However, in this case, it is desirable to shift the wavelength at which the diffraction efficiency of the required order light becomes maximum (that is, the optimized wavelength), to the short wavelength side of the wavelength band utilized.

According to such a construction, the unrequired order light at the short wavelength side is basically suppressed to the lower extent, and the unrequired order light at the long wavelength side is decreased effectively by the louver 30, so that the unrequired order light can be decreased over the full wave band. Moreover, the wavelength dependency for the diffraction efficiency is relatively gentle, so that even if the optimized wavelength is shifted to the short wavelength side, the diffraction efficiency of the required order light does not decrease extremely. Therefore, the wavelength distribution of required order light does not become unbalanced extremely, so that flare or the like due to the unrequired order light can be prevented effectively.

Figure 6:
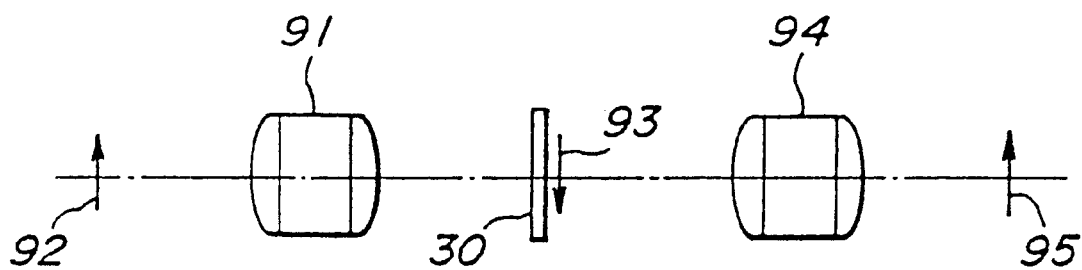
FIG. 6 is a plan view showing a fourth embodiment of the optical system according to the present invention.

FIG. 6 shows a fourth embodiment of the optical system according to the present invention, which shows a relay optical system. In this embodiment, a first lens group 91 forms an intermediate image 93 of an object 92, and a second lens group 94 forms a final image 95. The first lens group 91 includes a diffraction lens (not shown), thereby correcting a chromatic aberration or the like well by the action of the diffraction lens. In this embodiment, the louver 30 is disposed near the intermediate image 93 formed by the first lens group 91.

In this embodiment, the unrequired order light generated by the diffraction lens included in the first lens group 91 is decreased effectively by the louver 30 disposed near the position at which the intermediate image 93 is formed, so that it can be prevented effectively that the flare or the like is generated in the image plane, at which the final image 95 is formed.

Figure 7:
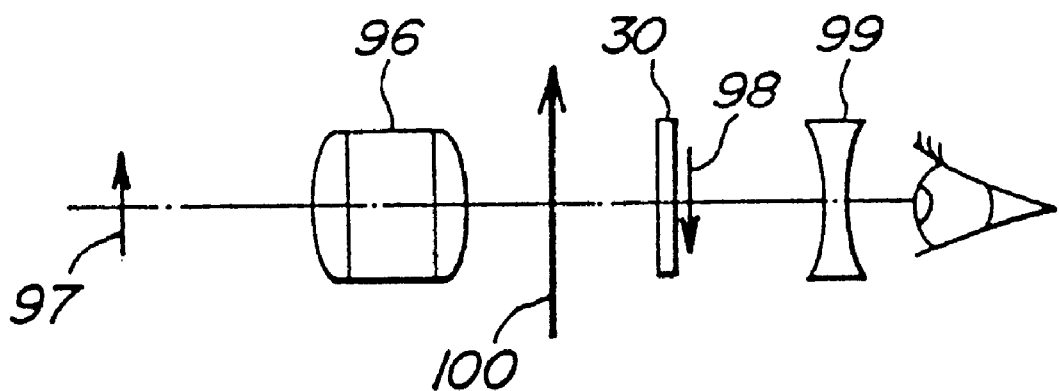
FIG. 7 is a plan view showing a fifth embodiment of the optical system according to the present invention.
Figure 8:
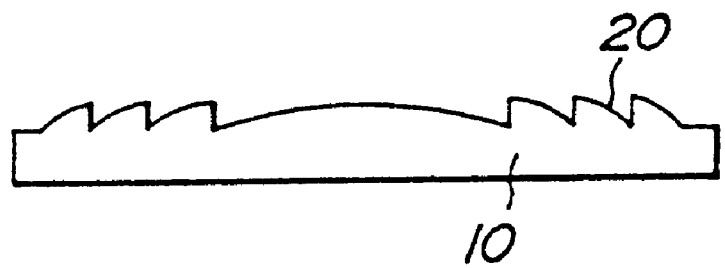
FIG. 8 is a cross-sectional view showing a diffraction ns used in the optical system according to the present invention.

FIG. 7 shows a fifth embodiment of the optical system according to the present invention, which shows a microscope optical system. In this embodiment, an objective lens group 96 forms an intermediate image 98 of an objective lens 97, and an ocular group 99 forms a virtual image 100 of the intermediate image 98. The objective lens group 96 includes a diffraction lens (not shown), thereby correcting a chromatic aberration or the like well with the action of the first lens group. In this embodiment, the louver 30 is disposed near the intermediate image 98 formed by the first lens group 96.

In this embodiment, the unrequired order light generated by the diffraction lens included in the objective lens group 96 is decreased effectively by the louver 30 disposed near the position at which the intermediate image 98 is formed, so that the generation of the flare or the like can be prevented effectively.

What is claimed is:

1. An optical system for forming an image of an object, the optical system comprising:

at least one diffraction optical element for receiving light from the object and for diffracting the light from the object to produce first diffraction light of a given order and second diffraction light of at least one order other than the given order;

at least one refraction optical element in series with the at least one diffraction optical element; and a diffraction light selection element, arranged in series with the at least one diffraction optical element and the at least one refraction optical element, for receiving the first diffraction light and the second diffraction light, transmitting the first diffraction light and attenuating the second diffraction light.

2. An optical system as claimed in claim 1, wherein the optical system has an image side which is constructed as a telecentric system.

3. An optical system as claimed in claim 1, wherein the diffraction optical element is blazed in such a manner that a wavelength in which a diffraction efficiency becomes maximum for the first diffraction light is positioned at a longer wavelength side of a visible wavelength band.

4. An optical system as claimed in claim 1, wherein the at least one diffraction optical element and the at least one refraction optical element have refraction powers of a same sign.

5. An optical system for forming an image of an object, the optical system comprising:

at least one diffraction optical element for receiving light from the object and for diffracting the light from the object to produce first diffraction light of a given order and second diffraction light of at least one order other than the given order; and a diffraction light selection element for receiving the first diffraction light and the second diffraction light, transmitting the first diffraction light and attenuating the second diffraction light, wherein the diffraction light selection element comprises a numerical aperture limiting member, arranged in series with the at least one diffraction optical element, for limiting a numerical aperture of the optical system for the second diffraction light, wherein:
the optical system is an optical system for forming only one image; and
the at least one diffraction optical element comprises a blazed diffraction lens.

6. An optical system as claimed in claim 5, wherein the numerical limiting aperture comprises a plurality of light transmitting portions and a plurality of light screening portions which are arranged alternately in one plane.

7. (Twice Amended) An optical system for forming an image of an object, the optical system comprising:
at least one diffraction optical element for receiving light from the object and for diffracting the light from the object to produce first diffraction light of a given order and second diffraction light of at least one order other than the given order; and
a diffraction light selection element for receiving the first diffraction light and the second diffraction light, transmitting the first diffraction light and attenuating the second diffraction light, wherein the diffraction light selection element comprises a numerical aperture limiting member, arranged in series with the at least one diffraction optical element, for limiting a numerical aperture of the optical system for the second diffraction light, wherein:
the numerical aperture limiting member comprises a plurality of light transmitting portions and a plurality of light screening portions which are arranged alternately in one plane, and
the plurality of light transmitting portions of the numerical aperture limiting member are inclined so as to be substantially parallel to a principal ray of the first diffraction light transmitted through the numerical aperture limiting member.

8. An optical system for forming an image of an object, the optical system comprising:
at least one diffraction optical element for receiving light from the object and for diffracting the light from the object to produce first diffraction light of a given order and second diffraction light of at least one order other than the given order;
a diffraction light selection element for receiving the first diffraction light and the second diffraction light, transmitting the first diffraction light and attenuating the second diffraction light, wherein the diffraction light selection element comprises a numerical aperture limiting member, arranged in series with the at least one diffraction optical element, for limiting a numerical aperture of the optical system for the second diffraction light; and
at least one refraction optical element in series with the at least one diffraction optical element.

9. An optical system for forming an image of an object, the optical system comprising:
at least one diffraction optical element for receiving light from the object and for diffracting the light from the object to produce first diffraction light of a given order and second diffraction light of at least one order other than the given order; and
a diffraction light selection element for receiving the first diffraction light and the second diffraction light, transmitting the first diffraction light and attenuating the second diffraction light, wherein the diffraction light selection element comprises a numerical aperture limiting member, arranged in series with the at least one diffraction optical element, for limiting a numerical aperture of the optical system for the second diffraction light, wherein the diffraction optical element is blazed in such a manner that a wavelength in which a diffraction efficiency becomes maximum for the first diffraction light is positioned at a longer wavelength side of a visible wavelength band.

* * * * *